United States Patent
Yokota et al.

[15] 3,648,049
[45] Mar. 7, 1972

[54] DOSIMETER USING A FLUORESCENT GLASS ELEMENT

[72] Inventors: Ryosuke Yokota; Yuhei Muto, both of Yokohama-shi, Japan

[73] Assignee: Tokyo Shibaura Electric Co., Ltd., Kawasaki-shi, Japan

[22] Filed: June 16, 1969

[21] Appl. No.: 833,621

[30] Foreign Application Priority Data

June 20, 1968 Japan....................................43/42381

[52] U.S. Cl. ....................................250/71.5 R, 250/83 CD
[51] Int. Cl. ..............................................................G01t 1/06
[58] Field of Search ..............................250/71, 71.5, 83 CD

[56] References Cited

UNITED STATES PATENTS 3,020,238  2/1962  Munakata............................250/83 X
3,042,802  7/1962  Just et al..................................250/83
3,169,188  2/1965  Horner et al............................250/83
3,283,152  11/1966  Yokota et al. ......................250/83 X Primary Examiner—James W. Lawrence
Assistant Examiner—Davis L. Willis
Attorney—George B. Oujevolk

[57] ABSTRACT

This dosimeter comprises a vessel having an inlet slit and outlet slit for ultraviolet rays and a slit for releasing fluorescent light beams which is opened in a direction almost perpendicularly intersecting the direction in which the ultraviolet rays are introduced. In said vessel is housed a trapezoidal fluorescent glass element whose operating plane is exposed to radiation in advance and so positioned as to face the ultraviolet-ray inlet slit and fluorescent light beam release slit and also to be inclined at an angle allowing for the total reflection of ultraviolet rays with respect to the direction in which they are brought in.

3 Claims, 3 Drawing Figures

Patented March 7, 1972
3,648,049
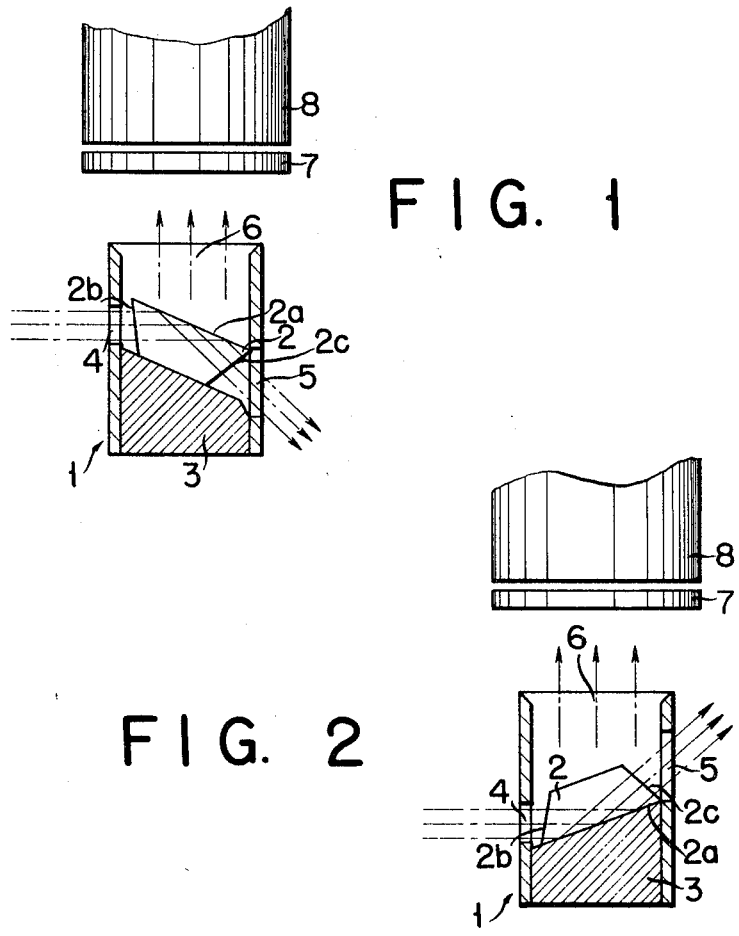
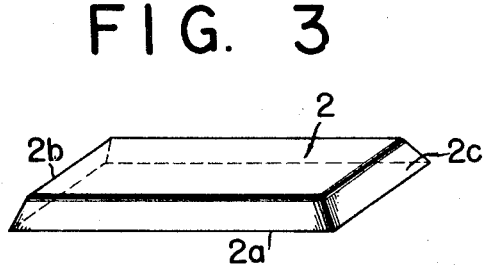
KYOSUKE YOKOTA
YUHEI MATO
INVENTORS
BY George B. Oujevolk
ATTORNEY

DOSIMETER USING A FLUORESCENT GLASS ELEMENT

BACKGROUND OF THE INVENTION

The present invention relates to a dosimeter using a fluorescent glass element which is so improved as to be adaptable for the quantitative determination of radioactive rays, particularly beta rays.

Glass prepared from silver-activated phosphate is generally known as fluorescent glass. Where this fluorescent glass is used in a dosimeter element, there are raised the following problems. With the prior art dosimeter, the plane of a fluorescent glass element exposed to radiation (hereinafter referred to as the operating plane) is so positioned as to intersect at right angles the direction in which exciting ultraviolet rays are brought in, and light beams from fluorescent nuclei are trapped by a detector disposed in a direction perpendicularly intersecting that in which said fluorescent light beams travel. However, when the fluorescent glass element is exposed in advance to beta rays issued from a source of $^{204}$Tl having a low level energy, for example, a maximum energy of 0.764 Mev. and an average energy of 0.234 Mev., the aforementioned conventional dosimeter can only trap such amounts of fluorescent light beams as are equivalent to about one-thirtieth of those which are released when gamma rays from $^{60}$Co are irradiated on fluorescent glass element under the same conditions. As generally understood, this is due to the fact that said fluorescent glass originally has a nature of causing the amounts of fluorescent light beams generated by the fluorescent nuclei to sharply decrease from the level of around 3 to 5 Mev.

On the other hand, exciting ultraviolet rays are stripped of rays belonging to the visible region by means of a filter before they are conducted to a fluorescent glass element. Depending on the composition of such filter, however, there are still retained some amounts of rays belonging to the red color region by the ultraviolet rays, insofar, as the filter does not obstruct the transmission of said ultraviolet rays.

However, if red beam-bearing ultraviolet rays brought to the fluorescent glass element are reflected at random from the inner wall surface of the vessel, said red beams are also likely to be carried to a detector. While the ultraviolet rays can be removed by a shielding filter positioned in front of the detector, the red beams contained in the ultraviolet rays act on the detector as do the fluorescent light beams to be determined, thus leading to erroneous issue of signals. This event has a serious effect on the determination of fluorescent light beams associated with beta rays having a low level energy, because the amounts of said fluorescent light beams are really small, and the quantitative determination thereof is sometimes made impossible.

Noticing the presence of a certain relationship between the energy level of beta rays and the amount of fluorescent light beams issued from the fluorescent nuclei, the inventors have conducted a series of experiments and as a result discovered that the fluorescent nuclei have such a distribution that with respect to the high energy level of beta rays, said nuclei extend from the exposed surface to the deeper part of the fluorescent glass element, whereas, in the case of the low energy level of beta rays, the nuclei are concentrated in a shallow depth, for example, about 10 microns below the exposed surface.

SUMMARY OF THE INVENTION

Based on the aforementioned fact, the present invention has been accomplished to improve a fluorescent glass element and provide a dosimeter using such glass element wherein the position of the glass element in the vessel is so devised that even when the element is exposed to beta rays of low energy level, sufficient amounts of fluorescent light beams from the glass element can be effectively trapped by a detector and red beam-bearing ultraviolet rays can be prevented to the best possible extent from being conducted to the detector.

Accordingly, the dosimeter of the present invention comprises a vessel having an inlet slit and outlet slit for ultraviolet rays and a slit for releasing fluorescent light beams which is opened in a direction intersecting almost at right angles the direction in which ultraviolet rays are introduced; means for supplying exciting ultraviolet rays to the inlet slit therefor; means for detecting fluorescent light beams coming through the release slit; and a fluorescent glass element whose operating plane is exposed to radiation in advance and so positioned as to face the ultraviolet-ray inlet slit and fluorescent light beam release slit and also to be inclined at an angle allowing for the total reflection of ultraviolet rays with respect to the direction in which they are brought in, said fluorescent glass element having such an optical plane as allows the ultraviolet rays to be totally reflected through the outlet slit so as to prevent them from being again carried through the operating plane of the glass element.

BRIEF EXPLANATION OF THE DRAWING

FIG. 1 is a fragmental side section of a dosimeter using a fluorescent glass device according to an embodiment of the present invention;

FIG. 2 is a fragmental side section of a dosimeter using a fluorescent glass device according to another embodiment of the invention; and FIG. 3 is a perspective view illustrating the shape of a fluorescent glass element.

DESCRIPTION OF THE PREFERRED EMBODIMENTS

Referring to FIG. 1, numeral 1 represents a vessel for housing a fluorescent glass element 2 prepared from silver-activated phosphate glass. The vessel 1 as a whole assumes a cylindrical form and has an inclined support plane 3 formed at the bottom. The opposing walls of the cylindrical vessel 1 are bored with an inlet slit 4 and outlet slit 5 for ultraviolet rays respectively, both being positioned above the inclined support plane 3. The upper opening of the vessel 1 is used as a slit 6 for releasing fluorescent light beams. Above the vessel 1 are serially arranged an ultraviolet-ray shielding filter 7 and photon amplifier 8 in a manner to face the fluorescent light beam release slit 6. By the side of the vessel 1 is disposed a super pressure mercury lamp (not shown), for example, a type displaying a continuous spectrum in which there appears the peak of spectral energy at a wavelength of 365 millimicrons. Between the mercury lamp and vessel 1 is interposed a prescribed filter (not shown) so designed as the draw out ultraviolet rays whose wavelength ranges from 345 to 380 millimicrons.

The fluorescent glass element 2 has a broader base plane or an operating plane 2a exposed to beta rays and a side plane or an ultraviolet-ray inlet plane 2b which is made to face the ultraviolet-ray inlet slit 4 when the glass element is placed in the vessel and intersect at right angles the direction in which ultraviolet rays are brought in. On the opposite side of the glass element 2 to the ultraviolet-ray inlet plane 2b is positioned another side plane or an ultraviolet-ray outlet plane 2c for releasing ultraviolet rays in a manner to face the ultraviolet-ray outlet slit 5.

The angle defined by the operating plane 2a with the ultraviolet-ray inlet plane 2b is set at a value allowing for the total reflection of ultraviolet rays, for example, at 70°. It is advisable to dispose the optical release plane 2c so as to perpendicularly intersect the direction in which the ultraviolet rays reflected by the operating plane 2a are allowed to proceed. A fluorescent glass element arranged as described above assumes a trapezoidal form as illustrated. With respect to the shape of the optical release plane, there will be no inconvenience if said shape is so designed as to prevent reflected ultraviolet rays from being transmitted through the operating plane 2a toward the photon amplifier, even when they are optically brought back to said operating plane 2a.

Further, it is indispensable for the total reflection of exciting inlet slit 4 that they be aligned into parallel beams by being allowed to pass through a suitable relay lens and condenser lens.

Generally, radioactive rays include not only beta rays but also X rays and gamma rays. Accordingly, where beta rays are to be determined, there are provided an aluminum filter 1.0 mm. thick and plastics filter having a density of 7 mg./cm.$^2$ respectively fitted to the operating planes of two fluorescent glass elements or the two divided regions of the operating plane of a simple fluorescent glass element. Fluorescent light beams released from the operating planes of the two fluorescent glass elements or the two divided regions of the operating plane of a single fluorescent glass element using the aforementioned two filters respectively are determined through the vessel using the photon amplifier 8, and the value of the $d$ sage of beta computed from the difference between the two determinations thus obtained is further converted to a proper value on the basis of the previously defined value of the amounts of beta rays emitted from natural uranium ($U_3O_8$) when used as a source of beta rays.

Parallel ultraviolet rays are conducted to the fluorescent glass element through the aforesaid inlet plane $2b$ to be totally reflected from the operating plane of said glass element with the resultant substantially complete withdrawal of the ultraviolet rays from the outlet plane $2c$. The released ultraviolet rays cause fluorescent light beams to be projected by the fluorescent nuclei concentrately distributed in the shallow region below the operating plane $2a$. These fluorescent light beams are allowed to pass through the release slit 6 to be trapped by the photon amplifier 8. In this case, not only fluorescent nuclei can be efficiently excited by the flux of fully released ultraviolet rays due to the inclined position of the operating plane $2a$, but also fluorescent light beams projected by the fluorescent nuclei distributed right below the operating plane $2a$ can be effectively trapped by the photon amplifier, because the operating plane $2a$ also faces said amplifier 8. Further, the present invention permits the total reflection of ultraviolet rays and almost prevents red beams from being conducted to the photon amplifier 8 through the operating plane $2a$ so that the invention has an effect of substantially eliminating the occurrence of errors in determining the amounts of fluorescent light beams.

To describe the feature of the dosimeter of the present invention having the aforementioned arrangement, let us take the example of determining beta rays from $^{204}$Tl by irradiating them on a fluorescent glass element through a material corresponding to an epidermis having a density of 7 mg./cm.$^2$. In this determination the amount of fluorescent light beams resulting from said beta rays prominently increased per rad of soft human tissue to 4.9 times the per rad amount of fluorescent light beams generated by gamma rays from $^{60}$Co when they were irradiated on a fluorescent glass element 8×8×.7 mm.

FIG. 2 illustrating another embodiment presents the condition of determination where the operating plane $2a$ is positioned on the opposite side of the fluorescent glass element 2 to the fluorescent light beam amplifier 8. The essential function of this embodiment does not vary at all from that of the aforementioned embodiment. It will be noted, however, that for the determination according to the embodiment of FIG. 2, the inlet slit 4 and outlet slit 5 for ultraviolet rays are positioned with respect to the level in the opposite relationship to what is observed in FIG. 1 and fluorescent light beams are conducted to the photon amplifier 8 through the opposite plane of the fluorescent glass element to the operating plane $2a$ thereof and released ultraviolet rays are prevented from being reflected back to that opposite plane.

What is claimed is:

1. A dosimeter using a fluorescent glass element which comprises an elongated longitudinal vessel having an inlet slit (4) on one side of the vessel and outlet slit (5) on the other side of the vessel but offset from said inlet slit for ultraviolet rays and a release slit (6) for releasing fluorescent light beams opening in a direction intersecting substantially at right angles the direction in which the ultraviolet rays are brought in; excitation means for supplying exciting ultraviolet rays to said inlet slit; an ultraviolet filter (7) and photon amplifier means (8) for detecting fluorescent light beams carried through said release slit; and a fluorescent glass element (2) having a trapezoidal cross section whose operating plane is so disposed in the vessel as to face the ultraviolet-ray inlet slit and fluorescent light beam release slit and also to be inclined at an angle towards the outlet slit allowing for the total reflection of ultraviolet rays with respect to the direction in which they are introduced, said fluorescent glass element having such an ultraviolet outlet plane as releases the totally reflected ultraviolet rays from the outlet slit in a manner to prevent them from being carried again through the operating plane or opposite plane thereto of said glass element.

2. The dosimeter according to claim 1 wherein the ultraviolet outlet plane is formed perpendicular to the direction in which the reflected ultraviolet rays are released.

3. In a dosimeter using a fluorescent glass element, in combination: an elongated longitudinal vessel having an inlet slit (4) on one side of the vessel and outlet slit (5) on the other side of the vessel but offset from said inlet slit for ultraviolet rays and a release slit for releasing fluorescent light beams opening in a direction intersecting substantially at right angles the direction in which the ultraviolet rays area brought in; excitation means for supplying exciting ultraviolet rays to said inlet slit; and a fluorescent glass element (2) having a trapezoidal cross section whose operating plane is so disposed in the vessel as to face the ultraviolet-ray inlet slit and fluorescent light beam release slit and also to be inclined at an angle towards the outlet slit allowing for the total reflection of ultraviolet rays with respect to the direction in which they are introduced, said fluorescent glass element having such an ultraviolet outlet plane as releases the totally reflected ultraviolet rays from the outlet slit in a manner to prevent them from being carried again through the operating plane or opposite plane thereto of said glass element.

* * * * *